United States Patent [19]

Vannesjö

[11] Patent Number: 4,610,842
[45] Date of Patent: Sep. 9, 1986

[54] FUEL ROD FOR A NUCLEAR REACTOR

[75] Inventor: Katarina L. Vannesjö, VästerÅs, Sweden

[73] Assignee: AB Asea-Atom, VästerÅs, Sweden

[21] Appl. No.: 594,320

[22] Filed: Mar. 28, 1984

[30] Foreign Application Priority Data

Mar. 30, 1983 [SE] Sweden .............................. 8301770

[51] Int. Cl.⁴ ............................................. G21C 3/00
[52] U.S. Cl. ................................. 376/416; 376/414; 376/417; 376/900
[58] Field of Search ............... 376/414, 416, 417, 900

[56] References Cited

U.S. PATENT DOCUMENTS

| 2,813,073 | 11/1957 | Saller et al. | 376/900 |
| 3,620,691 | 11/1971 | Rubel | 376/417 |
| 4,200,492 | 4/1980 | Armijo et al. | 376/417 |
| 4,372,817 | 2/1983 | Armijo et al. | 376/417 |

FOREIGN PATENT DOCUMENTS

| 5146691 | 4/1976 | Japan | 376/416 |
| 5422098 | 2/1979 | Japan | 376/417 |

OTHER PUBLICATIONS

Lyman et al., Metals Handbook, 1961, pp. 1228 and 1229.

Primary Examiner—Charles T. Jordan
Assistant Examiner—Richard W. Wendtland
Attorney, Agent, or Firm—Watson, Cole, Grindle & Watson

[57] ABSTRACT

A fuel rod for a nuclear reactor comprises a cladding tube of a zirconium-based alloy, on the internal surface of which there is arranged a layer of zirconium containing 0.1–1 per cent by weight tin. The fuel rod contains a nuclear fuel preferably of uranium dioxide.

5 Claims, 1 Drawing Figure

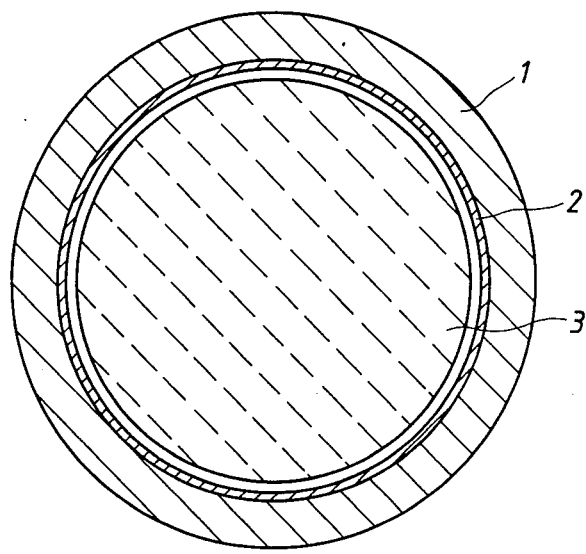

FUEL ROD FOR A NUCLEAR REACTOR

TECHNICAL FIELD

The present invention relates to a fuel rod for a nuclear reactor of a zirconium-based alloy on the internal surface of which a layer consisting essentially of zirconium is arranged.

BACKGROUND ART

As cladding tubes for fuel for nuclear reactors there are normally used thin-walled tubes of zirconium-based alloys, known under the trade name Zircaloy. These alloys contain alloying materials such as thin, iron, nickel, chromium and oxygen. The alloys become irradiation hardened under neutron irradiation. The irradiation hardening results in a brittling of the material and a greatly increased sensitivity to rod damage induced by stress corrosion. To counteract such an occurrence, it is known to provide the cladding tube internally with a layer of zirconium. The suitability of using zirconium for this purpose is due to zirconium having good resistance to hardening when exposed to neutron irradiation and to zirconium in itself being a relatively soft material. A zirconium layer on the inner surface of the cladding tube can therefore be deformed plastically and protect the cladding tubes from stresses occurring in case of power changes during operation.

According to U.S. Pat. No. 4,200,492, there is used in the internal layer zirconium with an impurity content of at least 1000 ppm (parts per million) by weight and at most 5000 ppm. Of the impurities, 200–1200 ppm consist of oxygen, which corresponds to the content of oxygen in commercial, reactor grade zirconium sponge. Contents of other impurities lie within the normal limits for the respective substance in commercial, reactor grade sponge zirconium, which means for aluminum 75 ppm or less, for boron 0.4 ppm or less, for cadmium 0.4 ppm or less, for carbon 270 ppm or less, for chromium 200 ppm or less, for cobalt 20 ppm or less, for copper 50 ppm or less, for hafnium 100 ppm or less, for hydrogen 25 ppm or less, for iron 1500 ppm or less, for magnesium 20 ppm or less, for manganese 50 ppm or less, for molybdenum 50 ppm or less, for nickel 70 ppm or less, for niobium 100 ppm or less, for nitrogen 80 ppm or less, for silicon 120 ppm or less, for tin 50 ppm or less, for tungsten 100 ppm or less, for titanium 50 ppm or less and for uranium 3.5 ppm or less.

According to U.S. Pat. No. 4,372,817, it is known to use in the internal layer zirconium with an impurity content of less than 1000 ppm, preferably less than 500 ppm. Of the impurities, the oxygen content is maintained at a level lower than about 200 ppm.

From U.S. patent application Ser. No. 279,477, filed July 1, 1981, now abandoned, it is known to use in the internal layer zirconium containing 0.1–3 percent by weight molybdenum and/or 0.03–1 percent by weight carbon and/or 0.03–1 percent by weight phosphorus and/or 0.03–1 percent by weight silicon. The zirconium may, in addition, contain the above-mentioned other impurities, included in commercial reactor grade sponge zirconium. The additions of molybdenum, carbon, phosphorus or silicon are assumed in the noted patent application to provide a precipitation of stable phases, such as intermetallic compounds, carbides, phosphides and silicides, in the form of free particles in the zirconium matrix. This precipitation would prevent a grain growth in connection with the manufacture of the tube, so that a structure with smaller grains is obtained in the zirconium than if the additions are not made. The different fine-grained structure would be responsible for the increased resistance to stress corrosion.

To obtain a good resistance to stress corrosion, it has thus previously been assumed that contents of other substances in the zirconium shall be maintained at a very low level or that such additions of other substances shall be made that a precipitation of stable compounds in the form of free particles is achieved in the zirconium matrix.

DISCLOSURE OF THE INVENTION

According to the present invention it has been found that a good resistance to stress corrosion can be achieved by using relatively high contents of tin in spite of the fact that tin gives no precipitation of free particles in the zirconium matrix but is dissolved therein. It is of special importance that the addition of tin in relatively high contents gives the zirconium increased resistance to the corrosive effect of water and water steam of high temperature. This property entails a slower formation of corrosion hydrogen so that high contents thereof cannot be developed and cause a deterioration of the mechanical properties of the cladding tube as a result of local hydriding.

According to the present invention, the layer consisting essentially of zirconium on the inside of the cladding tube contains 0.1–1 percent by weight tin. The total content of other substances in the zirconium is less than 0.5 percent by weight. Theses substances consist of impurities normally contained in reactor grade sponge zirconium and preferably present in contents previously stated herein.

The thickness of the layer consisting essentially of zirconium may amount to 0.005–0.8 mm, suitably to 0.04–0.32 mm and preferably to 0.05–0.1 mm. The thickness of the layer is suitably 5–40% and preferably 5–15% of the wall thickness of the cladding tube.

The zirconium-based alloy, on the inside of which the layer essentially consisting of zirconium is arranged, preferably consists of a zirconium-tin alloy, for example the zirconium-based alloys known under the trade names Zircaloy 2 and Zircaloy 4, whose contents of alloying materials lie within the limits 1.2–1.7% for tin, 0.07–0.24% for iron, 0.05–0.15% for chromium, 0–0.08% for nickel, 0.09–0.16% for oxygen, the balance being zirconium and impurities normally occurring in zirconium of reactor quality. Zircaloy 2 contains 1.2–1.7% tin, 0.07–0.20% iron, 0.05–0.15% chromium, 0.03–0.08% nickel and 0.09–0.16% oxygen. Zircaloy 4 contains 1.2–1.7% tin, 0.18–0.24% iron, 0.07–0.13% chromium and 0.09–0.16% oxygen. All percentages stated here relate to percentage by weight. The nuclear fuel in the fuel rod preferably consists of uranium dioxide.

BRIEF DESCRIPTION OF DRAWING

The invention will be explained in greater detail by way of examples with reference to the accompanying drawing, the single FIGURE of which shows a cross-section of a fuel rod according to the present invention for a light water nuclear reactor.

DESCRIPTION OF PREFERRED EMBODIMENTS 0.5 parts by weight tin is mixed with 99.5 parts by weight commercial, reactor grade sponge zirconium with the composition stated previously herein. A tube having a wall thickness of 1.25 mm and an external diameter of 44 mm is manufactured from the mixture while being melted. The tube is arranged inside a tube of Zircaloy 2 with a wall thickness of 10 mm and an internal diameter of 45 mm. The two tubes are welded together at the two end surfaces of the tubes. The composite tube thus obtained is extruded without being subjected to heating. The extruded product is thereafter cold-rolled in several stages with intermediate recrystallization annealings at a temperature of around 650° C. and a final annealing after the last rolling at a temperature of about 525° C., a tubular product as shown in the figure thus being obtained, consisting of a layer 1 of Zircaloy 2 having a thickness of 0.73 mm and an internal diameter of 10.65 mm and of a layer 2 of zirconium with alloyed tin having a thickness of 0.07 mm. The FIGURE also shows the nuclear fuel, which consists of circular-cylindrical pellets 3 of uranium dioxide stacked on top of each other in the axial direction of the cladding tube.

During corrosion tests which simulate the conditions in reactor operation, the internal layer of cladding tubes manufactured according to the present invention exhibits a weight gain which is less than 30 percent of the weight gain that a corresponding internal layer, which does not contain any alloyed tin, exhibits. The fuel rod according to the invention is primarily intended to be used in a reactor using water as coolant.

I claim:

1. In a nuclear reactor fuel rod which comprises a cladding tube, a nuclear fuel located within said cladding tube, said cladding tube being lined internally with an internal layer, said cladding tube having a certain thickness and being composed of a zirconium-based alloy which contains, by weight, from about 1.2 to about 1.7 percent of tin, from about 0.07 to about 0.24 percent of iron, from about 0.05 to about 0.15 percent of chromium, from about 0 to about 0.8 percent of nickel and from about 0.09 to about 0.16 percent of oxygen, the balance being zirconium and conventional impurities, said internal layer having a thickness which is less than that of said cladding tube, the improvement wherein said internal layer consists of a zirconium-tin alloy containing 0.1–1 percent by weight of tin, the balance being zirconium and impurities normally present in reactor grade sponge zirconium.

2. In a nuclear reactor fuel rod according to claim 1, wherein the impurities present in the internal layer are less than 0.5 percent by weight.

3. In a nuclear fuel reactor rod according to claim 1 or claim 2, wherein said nuclear fuel consists of uranium dioxide.

4. In a nuclear reactor fuel rod according to claim 1, wherein said internal layer has a thickness of from about 0.04 to about 0.32 mm.

5. In a nuclear reactor fuel rod according to claim 1, wherein said cladding tube has a wall thickness and wherein said internal layer has a thickness of 5–40% of said wall thickness of said cladding tube.

* * * * *

UNITED STATES PATENT AND TRADEMARK OFFICE
CERTIFICATE OF CORRECTION

PATENT NO. : 4,610,842
DATED : September 9, 1986
INVENTOR(S) : Katarina Lundblad-Vannesjö

It is certified that error appears in the above-identified patent and that said Letters Patent is hereby corrected as shown below:

On the title page:

Item [19] should read --Lundblad-Vannesjö"--
    [75] Inventor: Katarina Lundblad-Vannesjö,
                      Västerås, Sweden Signed and Sealed this Eighteenth Day of November, 1986

*Attest:*

DONALD J. QUIGG

*Attesting Officer*      *Commissioner of Patents and Trademarks*